US012286902B2

(12) United States Patent
Osgood et al.

(10) Patent No.: US 12,286,902 B2

(45) Date of Patent: Apr. 29, 2025

(54) TURBOMACHINE COOLING TRENCH

(71) Applicant: General Electric Company, Schenectady, NY (US)

(72) Inventors: Daniel Endecott Osgood, Loveland, OH (US); Zachary Daniel Webster, Cincinnati, OH (US); Gregory Terrence Garay, West Chester, OH (US); Kevin Robert Feldmann, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/418,909

(22) Filed: Jan. 22, 2024

(65) Prior Publication Data

US 2024/0209738 A1 Jun. 27, 2024

Related U.S. Application Data

(63) Continuation of application No. 17/852,875, filed on Jun. 29, 2022, now Pat. No. 11,879,356, which is a continuation of application No. 16/055,292, filed on Aug. 6, 2018, now Pat. No. 11,401,818.

(51) Int. Cl.

| | |
|---|---|
| ***F01D 5/18*** | (2006.01) |
| ***F01D 1/12*** | (2006.01) |
| ***F01D 5/14*** | (2006.01) |
| ***F01D 5/28*** | (2006.01) |
| ***F01D 11/12*** | (2006.01) |
| ***F01D 11/14*** | (2006.01) |

(52) U.S. Cl.

CPC ............... *F01D 5/186* (2013.01); *F01D 1/12* (2013.01); *F01D 5/147* (2013.01); *F01D 5/284* (2013.01); *F01D 11/12* (2013.01); *F01D 11/122* (2013.01); *F01D 11/14* (2013.01); *F05D 2220/32* (2013.01); *F05D 2230/31* (2013.01); *F05D 2230/311* (2013.01); *F05D 2240/303* (2013.01); *F05D 2240/304* (2013.01); *F05D 2260/201* (2013.01); *F05D 2260/202* (2013.01); *F05D 2300/514* (2013.01)

(58) Field of Classification Search

CPC ......... F05D 2260/202; F05D 2240/303; F05D 2260/201; F01D 5/18; F01D 5/183; F01D 5/186; F01D 5/147; F01D 5/187; F15D 1/0055; F15D 1/008

See application file for complete search history.

(56) References Cited

U.S. PATENT DOCUMENTS

| | | | |
|---|---|---|---|
| 4,347,037 | A | 8/1982 | Corrigan |
| 4,705,455 | A | 11/1987 | Sahm et al. |
| 4,726,735 | A | 2/1988 | Field et al. |

(Continued)

FOREIGN PATENT DOCUMENTS

| | | | |
|---|---|---|---|
| EP | 0924384 A2 * | 6/1999 | ............... F01D 5/18 |

*Primary Examiner* — Topaz L. Elliott

*Assistant Examiner* — Andrew J Marien

(74) *Attorney, Agent, or Firm* — McGarry Bair PC

(57) ABSTRACT

A component for a turbine engine includes a body with an exterior surface abutting a combustion flowpath for a combustion gas flow through the turbine engine, a cooling passage defined within the body, and a trench on the exterior surface. The trench includes a plurality of outlets, and a plurality of cooling holes extending from the cooling passage to the corresponding plurality of outlets.

20 Claims, 8 Drawing Sheets

(56) References Cited

U.S. PATENT DOCUMENTS

| | | | | |
|---|---|---|---|---|
| 4,827,587 | A | 5/1989 | Hall et al. | |
| 4,859,147 | A | 8/1989 | Hall et al. | |
| 5,246,340 | A | 9/1993 | Winstanley et al. | |
| 5,392,515 | A | 2/1995 | Auxier et al. | |
| 5,405,242 | A | 4/1995 | Auxier et al. | |
| 5,458,461 | A | 10/1995 | Lee et al. | |
| 5,660,524 | A | 8/1997 | Lee et al. | |
| 6,050,777 | A | 4/2000 | Tabbita et al. | |
| 6,099,251 | A | 8/2000 | LaFleur | |
| 6,241,468 | B1 | 6/2001 | Lock et al. | |
| 6,547,524 | B2 | 4/2003 | Kohli et al. | |
| 7,540,712 | B1 * | 6/2009 | Liang | F01D 5/186 416/97 R |
| 8,066,484 | B1 | 11/2011 | Liang | |
| 8,105,030 | B2 | 1/2012 | Abdel-Messeh et al. | |
| 9,394,796 | B2 | 7/2016 | Lacy et al. | |
| 9,416,665 | B2 | 8/2016 | Xu et al. | |
| 9,464,528 | B2 | 10/2016 | Zhang et al. | |
| 10,010,937 | B2 | 7/2018 | Bunker | |
| 10,240,464 | B2 | 3/2019 | Slavens et al. | |
| 2008/0286090 | A1 | 11/2008 | Okita | |
| 2013/0039777 | A1 * | 2/2013 | Piggush | F01D 9/065 416/97 R |
| 2013/0177448 | A1 * | 7/2013 | Spangler | B22C 7/02 164/47 |
| 2013/0183166 | A1 * | 7/2013 | Lacy | F01D 5/186 416/97 R |
| 2013/0209233 | A1 | 8/2013 | Xu et al. | |
| 2013/0315710 | A1 | 11/2013 | Kollati et al. | |
| 2014/0003960 | A1 | 1/2014 | Simpson et al. | |
| 2015/0017018 | A1 | 1/2015 | Lacy et al. | |
| 2016/0273365 | A1 | 9/2016 | Slavens et al. | |
| 2016/0369633 | A1 * | 12/2016 | Chan | F01D 5/18 |
| 2017/0129013 | A1 | 5/2017 | Bunker | |

* cited by examiner

TURBOMACHINE COOLING TRENCH

CROSS-REFERENCE TO RELATED APPLICATION(S)

This application is a continuation of U.S. patent application Ser. No. 17/852,875, filed Jun. 29, 2022, now U.S. Pat. No. 11,879,356, which is a continuation of U.S. Pat. No. 11,401,818, issued Aug. 2, 2022, both of which are incorporated herein by reference in its entirety.

FIELD

The present subject matter relates generally to turbine nozzles and blades of turbomachines. More particularly, the present subject matter relates to a cooling trench for airfoils and bands of gas turbine nozzles and blades.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

In general, turbine performance and efficiency may be improved by increased combustion gas temperatures. However, increased combustion temperatures can negatively impact the gas turbine engine components, for example, by increasing the likelihood of material failures. Thus, while increased combustion temperatures can be beneficial to turbine performance, some components of the gas turbine engine may require cooling features or reduced exposure to the combustion gases to decrease the negative impacts of the increased temperatures on the components.

Typically, the turbine section includes one or more stator vane and rotor blade stages, and each stator vane and rotor blade stage comprises a plurality of airfoils, e.g., nozzle airfoils in the stator vane portion and blade airfoils in the rotor blade portion. Because the airfoils are downstream of the combustion section and positioned within the flow of combustion gases, the airfoils generally include one or more cooling features for minimizing the effects of the relatively hot combustion gases, such as, e.g., cooling holes or slots, that may provide cooling within and/or over the surface of the airfoils. For example, cooling apertures may be provided throughout a component that allow a flow of cooling fluid from within the component to be directed over the outer surface of the component. Known cooling features may include cooling holes in a trench. For example, U.S. Pat. No. 8,105,030 of William Abdel-Messeh et al. (hereinafter "Abdel") generally describes a trench with cooling holes oriented spanwise on a leading edge of an airfoil. More particularly, the cooling holes provide cooling air from an interior cavity of the airfoil to the trench.

However, such cooling features may have drawbacks. For instance, cooling holes, slots, and/or cooling holes in trenches may not provide full coverage of cooling air near the cooling feature. Further, the cooling air may not persist fully downstream of the cooling feature, which may lead to relative hot spots on the surface of the component.

As such, a cooling feature for turbomachine components able to provide better cooling air coverage and improved persistence downstream from the cooling feature would be useful.

BRIEF DESCRIPTION OF THE DRAWINGS

A full and enabling disclosure of the present disclosure, including the best mode thereof, directed to one of ordinary skill in the art, is set forth in the specification, which makes reference to the appended FIGS., in which.

Figure 1:
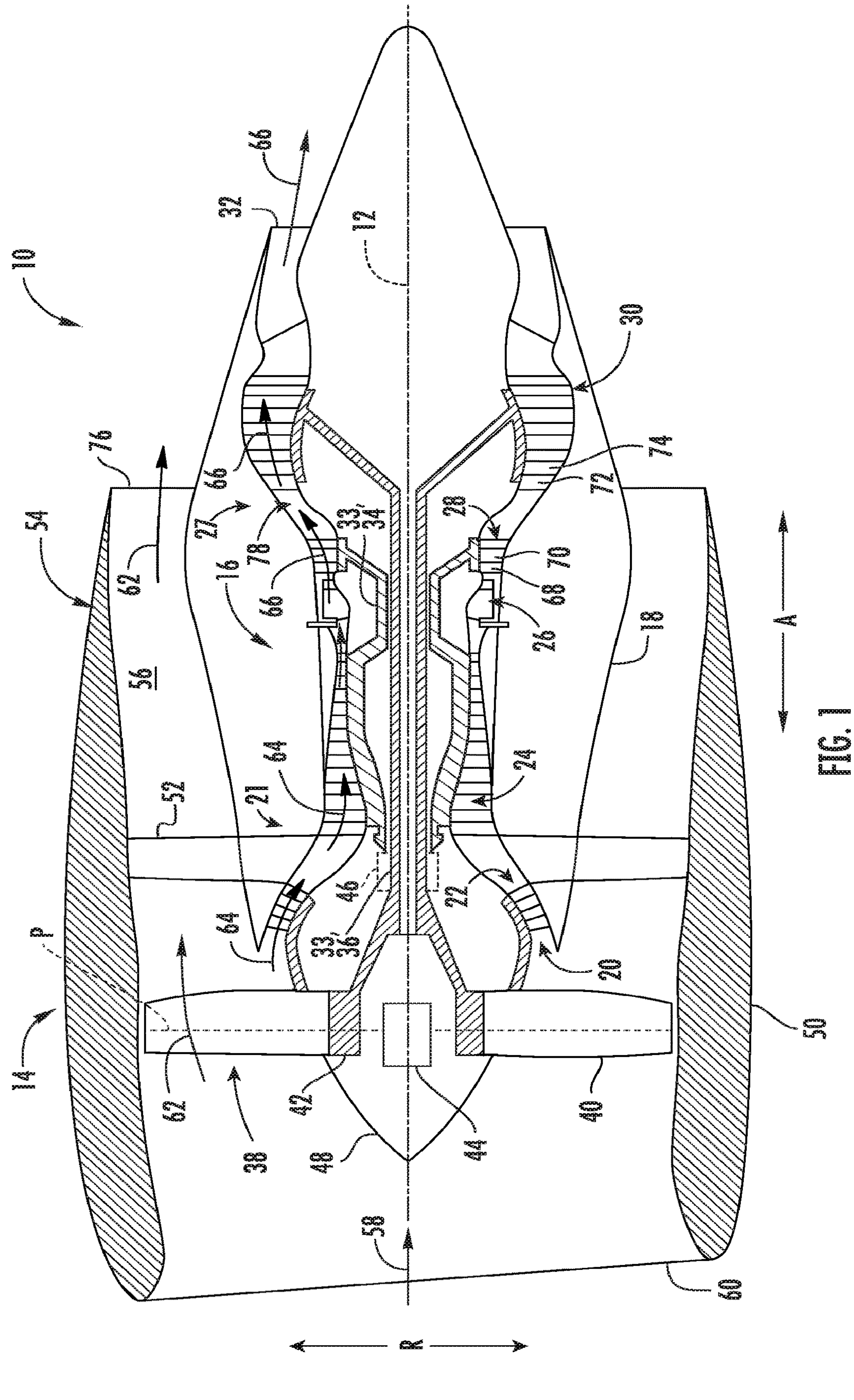
FIG. 1 illustrates a schematic, cross-sectional view of a gas turbine engine in accordance with aspects of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components, unless indicated otherwise.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A component including a trench with tangential outlets for cooling holes may direct cool air along a contour of the component increase the effectiveness of the cool air. For example, cool air may fill the trench before flowing downstream. Thus, the trench may help prevent the formation of hot spots in between cooling holes. Further, the cool air directed along the contour of the component may persist further downstream of the component. By persisting further downstream, the cool air may dissipate more heat from the component and/or form a more robust cooling film over the component. It should also be recognized that less cool air may be required for the trench of the present disclosure. Thus, several embodiments of the trench may increase efficiency by bleeding less compressed air from a core turbine engine of the gas turbine engine.

It should be appreciated that, although the present subject matter will generally be described herein with reference to a gas turbine engine, the disclosed systems and methods may generally be used on components within any suitable type of turbine engine, including aircraft-based turbine engines, land-based turbine engines, and/or steam turbine engines. Further, though the present subject matter is generally described in reference to stators and rotors in a turbine section, the disclosed systems and methods may generally be used on any component subjected to increased temperatures where film cooling may be desirable.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is configured as a high-bypass turbofan jet engine. Though, in other embodiments, the gas turbine engine 10 may be configured as a low-bypass turbofan engine, a turbojet engine, a turboprop engine, a turboshaft engine, or other turbomachines known in the art. As shown in FIG. 1, the gas turbine engine 10 defines an axial direction A (extending parallel to a longitudinal centerline 12 provided for reference) and a radial direction R. In general, the gas turbine engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section 21 including a booster or low pressure (LP) compressor 22 and a high pressure (HP) compressor 24; a combustion section 26; a turbine section 27 including a high pressure (HP) turbine 28 and a low pressure (LP) turbine 30; and a jet exhaust nozzle section 32. The gas turbine engine 10 includes at least one rotating shaft 33 drivingly coupled between the compressor section 21 and the turbine section 27. For example, a high pressure (HP) shaft or spool 34 may drivingly connect the HP turbine 28 to the HP compressor 24. Similarly, a low pressure (LP) shaft or spool 36 may drivingly connect the LP turbine 30 to the LP compressor 22.

For the depicted embodiment, fan section 14 includes a variable pitch fan 38 having a plurality of fan blades 40 coupled to a disk 42 in a spaced apart manner. As depicted, fan blades 40 extend outward from disk 42 generally along the radial direction R. Each fan blade 40 is rotatable relative to disk 42 about a pitch axis P by virtue of the fan blades 40 being operatively coupled to a suitable actuation member 44 configured to vary the pitch of the fan blades 40. Fan blades 40, disk 42, and actuation member 44 are together rotatable about the centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the gas turbine engine 10, a volume of air 58 enters the gas turbine engine 10 through an associated inlet 60 of the nacelle 50 and/or fan section 14. As the volume of air 58 passes across fan blades 40, a first portion of the volume of air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gas 66.

The combustion gas 66 are routed through the HP turbine 28 where a portion of thermal and/or kinetic energy from the combustion gas 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gas 66 are then routed through the LP turbine 30 where a second portion of thermal and kinetic energy is extracted from the combustion gas 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gas 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. At least one of the combustion section 26, HP turbine 28, the LP turbine 30, or the jet exhaust nozzle section 32 at least partially define a flowpath 78 for routing the combustion gas 66 through the core turbine engine 16. Various components may be positioned in the flowpath 78 such as the HP turbine stator vanes 68, HP turbine rotor blades 70, the LP turbine stator vanes 72, and/or the LP turbine rotor blades 74. Further, such components may require cooling to withstand the increased temperatures of the combustion gas 66.

Figure 2:
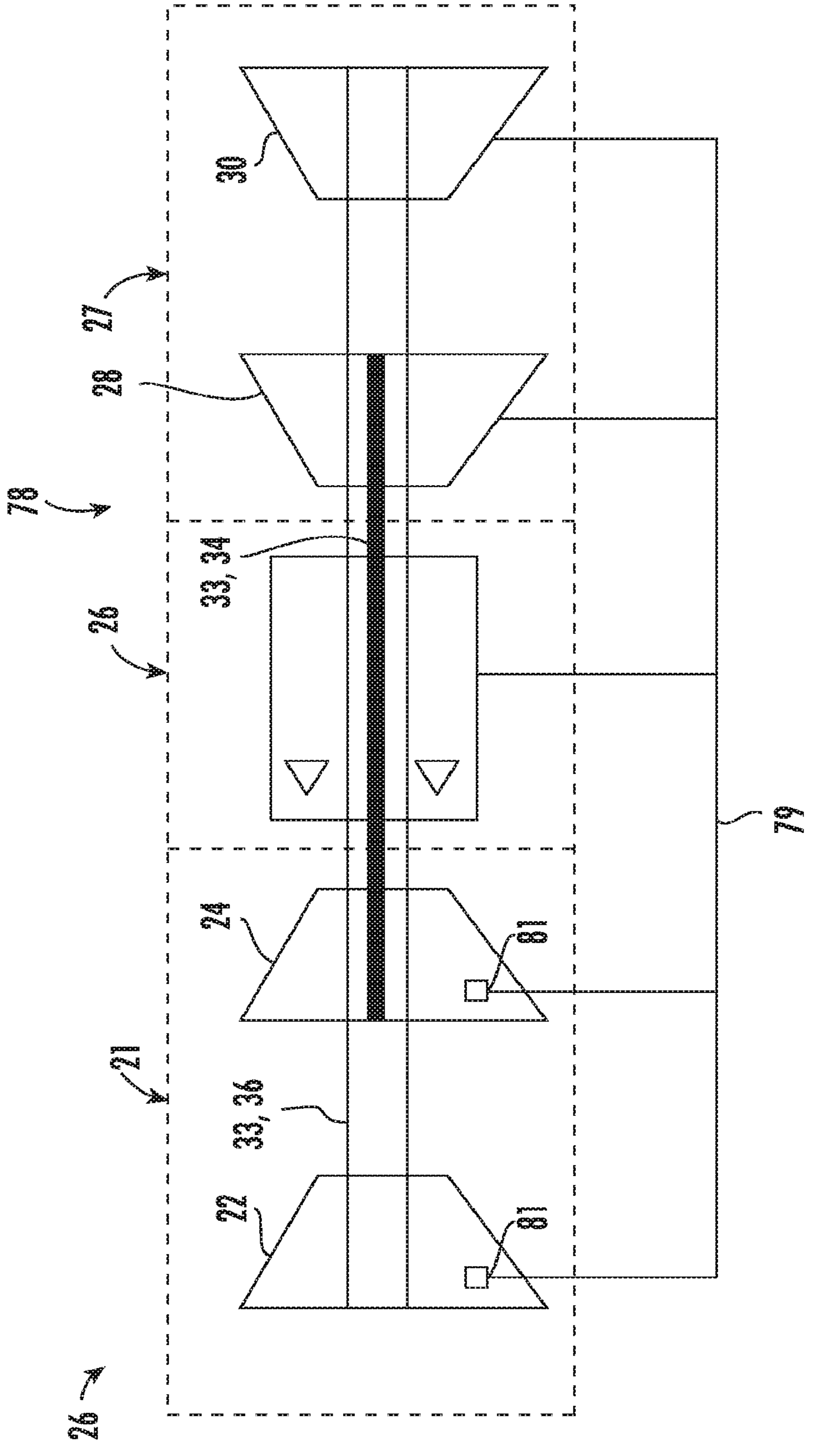
FIG. 2 illustrates a schematic view of the core turbine engine of FIG. 1 in accordance with aspects of the present disclosure, particularly illustrating a bleed-air conduit for supplying pressurized, cool air.

Referring now to FIG. 2, a schematic view of the core turbine engine 16 is illustrated according to aspects of the present subject matter. Particularly, FIG. 2 illustrates a bleed-air conduit 79 for supplying pressurized, cool air from the compressor section 21. For example, at least one of the LP compressor 22 or the HP compressor 24 may include a bleed port 81 configured to bleed-air from the second portion of air 64 flowing through the compressor section 21. Further, the bleed-air conduit 79 may direct the bleed-air through various structures such as the outer casing 18 to the combustion section 26 and/or the turbine section 27. For example, the bleed-air conduit 79 may fluidly couple at least one of the compressors 22, 24 to at least one of the turbines 28, 30. Though, in other embodiments, it should be recognized that the bleed port 81 may be positioned in the bypass airflow passage 56 and bleed air from the first portion of air 62. As such, the pressurized, cool air may be utilized to cool various components positioned in the flowpath 78.

Figure 3:
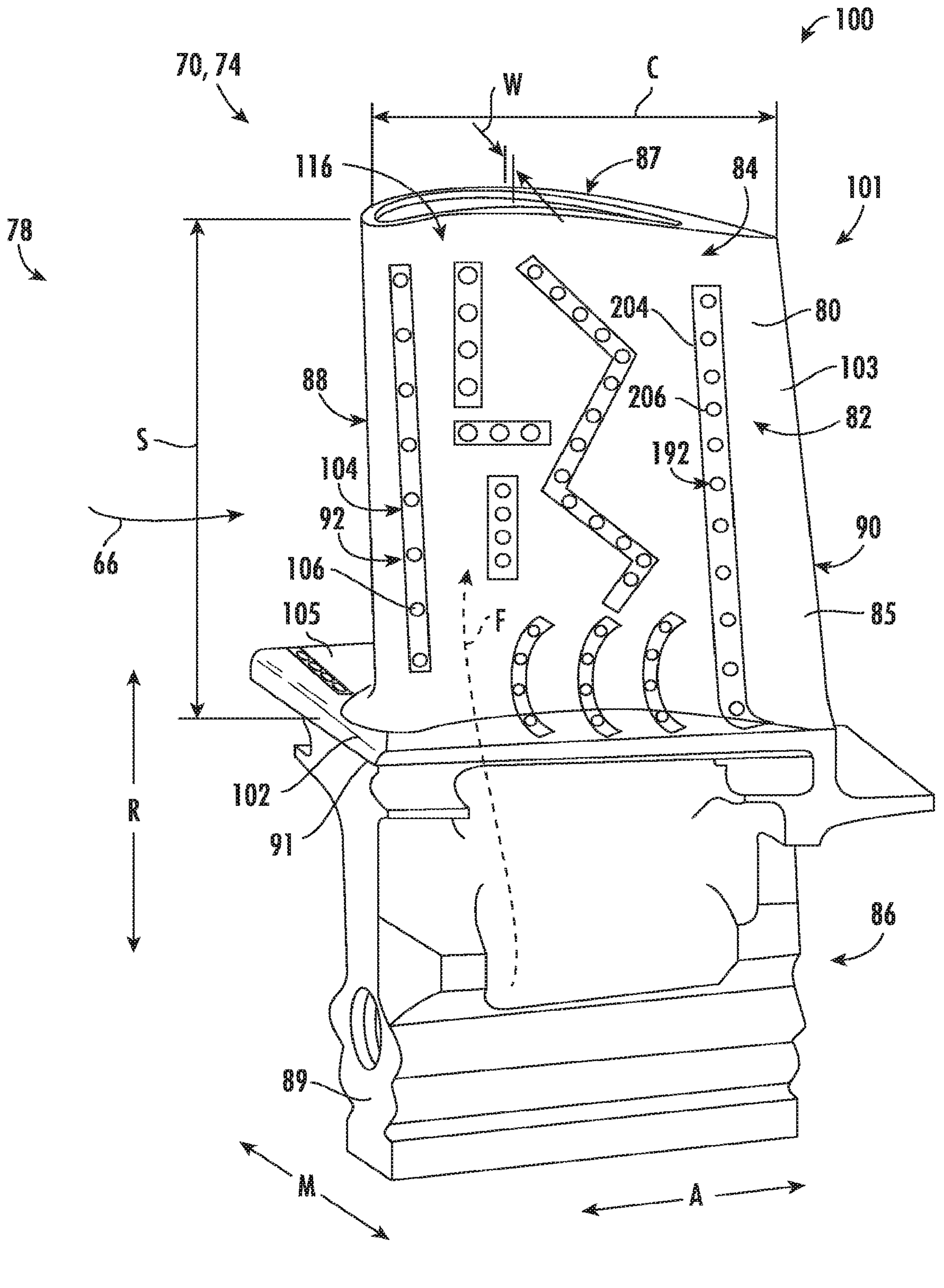
FIG. 3 illustrates a perspective view of one embodiment of a component of the gas turbine engine of FIG. 1 in accordance with aspects of the present disclosure, particularly illustrating the component configured as a turbine rotor blade.

Referring now to FIG. 3, a perspective view of one embodiment of a component 100 of the gas turbine engine 10 is illustrated according to aspects of the present disclosure. Particularly, FIG. 3 illustrates the component configured as a turbine rotor blade. The component may include a body 101 having an exterior surface 103 abutting the flowpath 78 such that the hot combustion gas 66 flows past and/or through the component 100. In certain embodiments, the body 101 may include a first band 102. In such embodiments, the exterior surface 103 may include a first band surface 105. For example, the first band surface 105 may at least partially defining the flowpath 78 such that the hot combustion gas 66 flows through the flowpath 78. As such, the first band surface 105 may define an inner most boundary of the flowpath 78 in a radial direction R defined relative to the centerline 12. Generally, the hot combustion gas 66 may flow from the combustion section 26 upstream of the component 100 past or through the component 100. It should be recognized that the flowpath 78 may further be defined by the outer casing 18 as described in regards to FIG. 1 and/or adjacent components 100 including respective first bands 102. The first band 102 may be heated by the hot combustion gas 66 flowing past the first band 102.

The body 101 of the component 100 may further include an airfoil 80. In such embodiments, the exterior surface 103 may include an airfoil surface 85. In certain embodiments, the body 101 may be the airfoil 80. In other embodiments, the airfoil 80 may extend in the radial direction R from the first band 102. Further, the airfoil surface 85 may include a pressure side 82 and a suction side 84. The airfoil surface 85 may also include a leading edge 88 at a forward position of the airfoil 80 in an axial direction A defined relative to the centerline 12. The airfoil surface 85 may further include a trailing edge 90 at an aft position of the airfoil 80 in the axial direction A. Further, the airfoil 80 may extend from a blade root 86 to a blade tip 87 along a span S. For example, the airfoil 80 may extend out into the flowpath 78 of the hot combustion gas 66. As such, the hot combustion gas 66 may flow over a combination of the pressure side 82, suction side 84, leading edge 88, and/or trailing edge 90 and thereby heat the airfoil 80. The airfoil 80 may define a chord C extending axially between the opposite leading and trailing edges 88, 90. Moreover, airfoil 80 may define a width W between the pressure side 82 and the suction side 84. The width W of airfoil 80 may vary along the span S.

The component 100 may also include a cooling passageway 116 defined in the body 101 to supply cool air F to the component 100. For example, the cooling passageway may be defined through at least one of the airfoil 80 or the first band 102. It should be recognized that the cooling passageway 116 may be fluidly coupled to the bleed-air conduit 79 and receive pressurized, cool air from the compressor section 21 (see, e.g., FIG. 2). In other embodiments, the cool air F may be pressurized cool, air from another component of the gas turbine engine 10, such as a pump. The cool air F received within the cooling passageway 116 is generally cooler than the hot combustion gas 66 flowing against or over the exterior surface 103 of the airfoil 80 and/or the first band 102.

The component 100 may include a trench 104 defined on the exterior surface 103. For example, the trench 104 may be defined on at least one of the first band surface 105 or the airfoil surface 85. The component 100 may further include a plurality of cooling holes 106 extending between the cooling passageway 116 and a plurality of outlets 92 defined in the trench 104 such that the trench 104 is fluidly coupled to the cooling passageway 116. In certain embodiments, the pressure of the cool air F in the cooling passageway 116 may be greater than the pressure of the hot combustion gas 66. For example, a greater pressure from within the component 100 may expel the cool air F out of the cooling holes 106. As such, the cool air F may flow along a contour of the component 100, such as the exterior surface 103. For example, the cool air F may flow along the airfoil surface 85 and/or the first band surface 105. It should be recognized that the cool air F may both cool the component 100 as well as create a film layer of cool air F between the hot combustion gas 66 and the component 100. The cooling holes 106 may extend along a full length of the trench 104 or may extend along a portion of the trench 104. The cooling holes 106, outlets 92, and/or cooling passageway 116 may also cool the component 100 via bore cooling. For example, the flow of cool air F through the cooling passageway 116 and subsequently the cooling holes 106 may further cool the component 100.

It should be recognized that the airfoil 80 may also include one or more structural elements housed within the airfoil surface 85. For example, one or more struts, spar caps, flanges, beams, or similar structures known in the art may provide rigidity to the airfoil 80 and/or the component 100. Further, the component 100 may include additional structural elements, such as structural elements coupled between the first band 102 and the airfoil 80 or structural elements housed within the first band 102.

In one embodiment, the trench 104 may be positioned on the airfoil surface 85, such as along a span S of the body 101.

In such an embodiment, the cool air F may be directed toward the airfoil surface 85 to cool the component 100. In another embodiment, the trench 104 may be positioned on the airfoil surface 85 along a chord C of the body 101 and/or generally along the streamlines of the hot combustion gas 66. In such embodiments, trench 104 may curve or follow the streamlines. In one embodiment, the trench 104 may be positioned on the first band 102. In such an embodiment, the cool air F may be directed toward and cool the first band surface 105. In a still further embodiment, the trench 104 may be positioned on both the first band surface 105 and the airfoil surface 85. For example, the trench 104 may be positioned across a joint 91 between the first band 102 and the airfoil 80. As such, the cooling holes 106 and/or outlets 92 may be positioned on the joint 91, the first band surface 105, the airfoil surface 85, and/or any combination of the above. In such an embodiment, the cool air F may be directed toward and cool the contour of the component 100 such as both the airfoil surface 85, the first band surface 105, and/or the joint 91 therebetween. Though, in other embodiment, it should be recognized that the trench 104 and outlets 92 may be positioned on the exterior surface 103 at any location such that the cooling holes 106 and/or outlets 92 may provide cool air F to the component 100. For example, the trench may be positioned on the leading edge 88 of the airfoil surface 85 (see, e.g., FIGS. 9 and 10).

In one embodiment, the trench 104 may be a linear shaped trench. For example, the trench 104 may define an approximate straight line along a length of the trench 104. In other embodiments, the trench 104 may be a non-linear shaped trench. For example, the trench 104 may define an arc along the length of the trench 104. Still, in other embodiments, the trench 104 may define a zig-zag pattern and/or a switchback pattern along the length of the trench 104. It should be recognized that the trench 104 may define any shape or include any combination of shapes configured to direct the cool air F along the contour of the component 100. For example, the trench 104 may define a straight segment, a curved segment, and a zig-zag segment.

In a still further embodiment, the component 100 may include a second trench 204. The second trench may 204 be configured generally as the first trench 104. For example, the second trench 204 may be defined on the exterior surface 103, such as on at least one of the first band surface 105 or the airfoil surface 85. In such embodiments, a second plurality of cooling holes 206 may extend between the cooling passageway 116 and a second plurality of outlets 192 defined in the second trench 204 such that the second trench 204 is fluidly coupled to the cooling passageway 116. Further, a pressure differential between the cooling passageway 116 and the flowpath 78 may expel the cool air F out of the second cooling holes 206 and/or second outlets 192 to flow along the contour of the component 100. It should be recognized that the second trench 204 may be positioned at any location the first trench 104 may be positioned as described herein. Further, the component 100 may include any number of additional trenches 104 and cooling holes 106. For example, three or more trenches 104 and associated cooling holes 106 may be positioned on the component 100. In certain embodiments, a series of trenches 104 may be positioned along the component 100. For example, a series of curved trenches, straight trenches, zig-zag trenches, or any other trenches 104 with various configurations may be positioned on the component 100 in line relative to the flowpath 78. In another embodiment, two or more trenches 104 may be positioned end to end with a gap or space in between trenches 104. For example, two or more trenches 104 may be arranged end to end along the span S of the airfoil 80.

Still referring to FIG. 3, in one embodiment, the component 100 may be a turbine rotor blade. For example, the turbine rotor blade may be the LP turbine rotor blade 74 or the HP turbine rotor blade 70. In such embodiments, the airfoil 80 may be a turbine blade. In other embodiments, the component 100 may be any other turbine rotor blade of the gas turbine engine 10, such as an intermediate turbine blade.

Each turbine rotor blade 70, 74 may be drivingly coupled to the rotating shaft 33 or spool, such as the high pressure shaft 34 or low pressure shaft 36, via the blade root 86. In certain embodiments, the first band 102 may be coupled to the rotating shaft 33. Still further, the blade root 86 may be coupled to a turbine rotor disk (not shown), which in turn is coupled to the rotating shaft 33 (e.g., FIG. 1). It will be readily understood that, as is depicted in FIG. 3 and is generally well-known in the art, the blade root 86 may define a projection 89 having a dovetail or other shape for receipt in a complementarily shaped slot in the turbine rotor disk to couple the turbine rotor blade 70, 74 to the disk. Of course, each turbine rotor blade 70, 74 may be coupled to the turbine rotor disk and/or rotating shaft 33 in other ways as well. In any event, turbine rotor blades 70, 74 are coupled to the turbine rotor disks such that a row of circumferentially adjacent turbine rotor blades 70, 74 extend radially outward from the perimeter of each disk into, i.e., the flowpath 78. The hot combustion gas 66 flowing through the flowpath 78 may create a pressure differential over the turbine rotor blades 70, 74 causing the turbine rotor blades 70, 74 and thus the rotating shaft 33 to rotate. As such, the turbine rotor blades 70, 74 may transform the kinetic and/or thermal energy of the hot combustion gas 66 into rotational energy to drive other components of the gas turbine engine (e.g., one or more compressors 22, 24 via one or more rotating shafts 33).

Adjacent turbine rotor blades 70, 74 within a blade row may be spaced apart from one another along a circumferential direction M and each turbine rotor blade 70, 74 may extend from the disk along the radial direction R. As such, the turbine rotor disk and outer casing 18 form an inner end wall and an outer end wall, respectively, of the flowpath 78 through the turbine assembly. Further, each of the turbine rotor blades 70, 74 may transfer kinetic/thermal energy from the hot combustion gas 66 into rotation energy.

Figure 4:
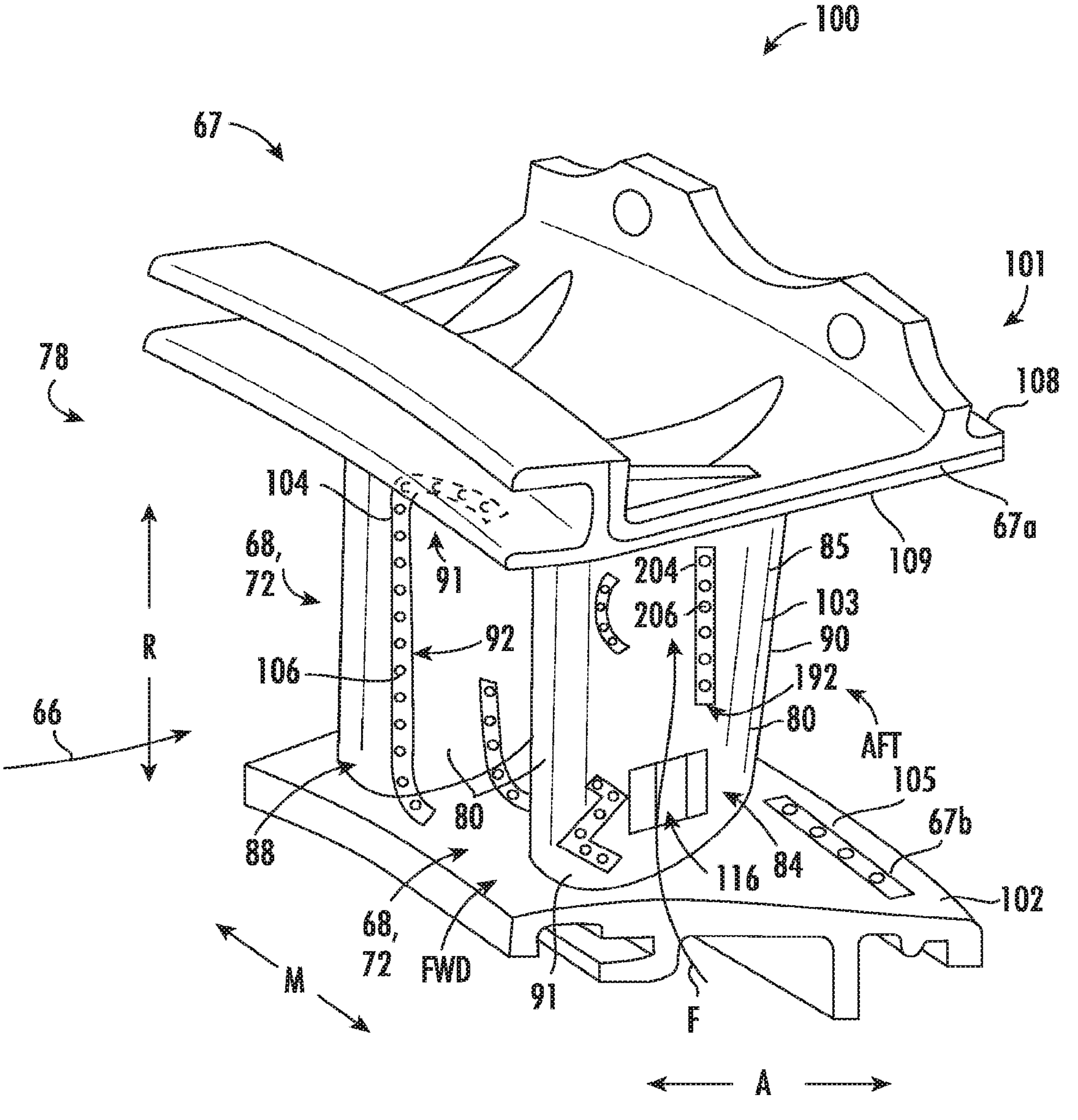
FIG. 4 illustrates a perspective view of another embodiment of the component of the gas turbine engine of FIG. 1 in accordance with aspects of the present disclosure, particularly illustrating the component configured as a turbine nozzle.

Referring now to FIG. 4, one embodiment of a component 100 is illustrated in accordance with aspects of the present disclosure. Particularly, FIG. 4 illustrates the component 100 configured as a turbine nozzle 67. For example, the component 100 may be the turbine nozzle 67 of the HP turbine 28 and/or the LP turbine 30. A turbine stator is formed by a plurality of turbine nozzles 67 that are abutted at circumferential ends to form a complete ring about centerline 12. In such embodiments, the body 101 may include a second band 108 positioned radially outward from the first band 102. Further, the exterior surface 103 of such embodiments may include a second band surface 109. For example, the second band surface 109 may at least partially define the flowpath 78 for the hot combustion gas 66. As such, the second band surface 109 may define an outer most boundary of the flowpath 78. Further, the second band 108 may at least partially define the cooling passageway 116 to provide cool air F to the second band 108.

Each turbine nozzle 67 may include the airfoil 80 configured as a vane, such as the HP turbine stator vanes 68 or LP turbine stator vanes 72, that extends between the first band 102, configured as an inner band, and the second band 108, configured as an outer band. Each turbine stator vane 68, 72 includes an airfoil 80, which has the same features as the airfoil 80 described above with respect to turbine rotor blade 70, 74. For example, airfoil 80 of the stator vane 68, 72 may have a pressure side 82 opposite a suction side 84. Opposite pressure and suction sides 82, 84 of each airfoil 80 may extend radially along a span from a vane root at an inner band 67*b* to a vane tip at an outer band 67*a*. Moreover, pressure and suction sides 82, 84 of the airfoil 80 may extend axially between a leading edge 88 and an opposite trailing edge 90. The airfoil 80 may further define a chord extending axially between opposite leading and trailing edges 88, 90. Moreover, the airfoil 80 may define a width between pressure side 82 and suction side 84, which may vary along the span.

It will be appreciated that, although the airfoil 80 of turbine stator vane 68, 72 may have the same features as the airfoil 80 of turbine rotor blade 70, 74, the airfoil 80 of turbine stator vane 68, 72 may have a different configuration than the airfoil 80 of turbine rotor blade 70, 74. As an example, the span of airfoil 80 of turbine stator vane 68, 72 may be larger or smaller than the span of the airfoil 80 of the turbine rotor blade 70, 74. As another example, the width and/or chord of the airfoil 80 of the turbine stator vane 68, 72 may differ from the width and/or chord of the airfoil 80 of the turbine rotor blade 70, 74. Additionally or alternatively, airfoils 80 of the LP turbine stator vanes 72 and/or airfoils 80 of HP turbine rotor blades 70 may differ in size, shape, and/or configuration from airfoils 80 of HP turbine stator vanes 68 and LP turbine rotor blades 74. However, it also should be understood that, while airfoils 80 may differ in size, shape, and/or configuration, the subject matter described herein may be applied to any airfoil 80 within the gas turbine engine 10, as well as other suitable components 100 of gas turbine engine 10.

The turbine nozzle 67 may direct the hot combustion gas 66 through the flowpath 78. Further, the turbine nozzle 67 may increase the speed of the hot combustion gas 66 thereby increasing the dynamic pressure while decreasing the static pressure. In such embodiments, the second band 108 may at least partially define the flowpath 78. Further, the airfoil surface 85 and/or the second band surface 109 may be heated by the hot combustion gas 66 flowing through the flowpath 78.

The component 100 of FIG. 4 may include one or more trenches 104 and associated cooling holes 106 and outlets 92 as described generally in regards to FIG. 3. For example, the component 100 may include linear and/or non-linear shaped trenches 104, as well as a second trench 204, or a series of trenches 104. Further, the trench(es) 104 may positioned on the exterior surface 103, such as at least one of the first band surface 105, the airfoil surface 85, or the second band surface 109. In one particular embodiment, the trench(s) 104 may be positioned on the second band surface 109. In such an embodiment, the cool air F may be directed toward and cool the contour of the second band 108, such as the second band surface 109. In a further embodiment, the trench(es) 104 may be positioned on both the second band surface 109 and the airfoil surface 85. For example, the trench(s) 104 may be positioned across a joint 91 between the second band 108 and the airfoil 80. In such an embodiment, the cool air F may be directed toward and cool the contour of the component 100, such as both the airfoil surface 85 and the second band surface 109. In a still further embodiment, the trench(es) 104 may be positioned on the first band surface 105, the airfoil surface 85, and the second band surface 109. For example, the trench 104 may approximately extend across an entire span of the turbine nozzle 67 such as the entire span of the airfoil surface 85 and across the joints 91 between the airfoil 80 and the first and second bands 102, 108. In such an embodiment, the cool air F may be directed toward and cool the first band surface 105, the second band surface 109, and the airfoil surface 85.

It should be recognized that, though the component 100 has been described as a turbine rotor blade or a turbine nozzle, the component 100 may be any structure of the gas turbine engine 10 with an exterior surface 103 exposed to the hot combustion gas 66. For example, the component 100 may include one or more combustor deflectors, combustor liners, shrouds, or exhaust nozzles.

Figure 5:
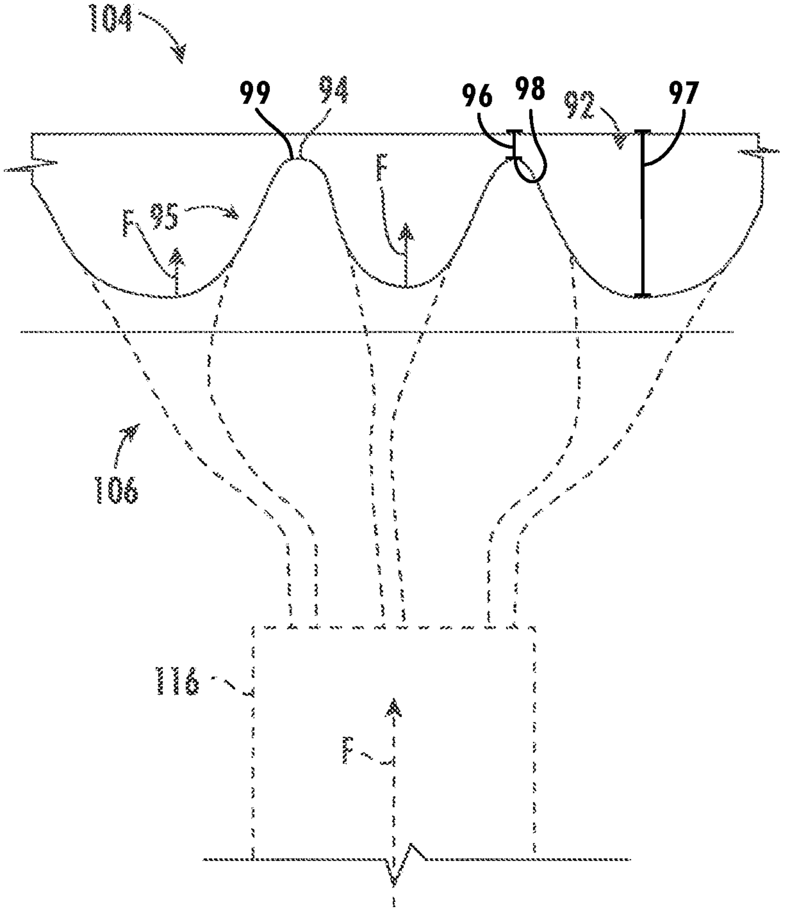
FIG. 5 illustrates a top view on one embodiment of a trench in accordance with aspects of the present disclosure, particularly illustrating cooling holes of the trench.

Referring now to FIG. 5, a top view of one embodiment of the trench 104 is illustrated according to aspects of the present disclosure. Particularly, FIG. 5 illustrates the cooling holes 106 of the trench 104. It should be recognized the leading face 110 and trailing face 112 are omitted for clarity. Each cooling hole 106 may define an outlet 92 for exhausting the cool air F for cooling the component 100, such as the exterior surface 103. The outlets 92 of the cooling holes 106 may be equally spaced within the trench 104 or define variable gaps between outlets 92. In other embodiments, a portion of the trench 104 may include equally spaced outlets 92 while another portion of the trench may include outlets 92 closer or farther apart. For example, a part of the component 100 downstream of the trench 104 may require more cool air F. Thus, the outlets 92 may be spaced closer together upstream of that portion.

In certain embodiments, cooling walls 94 may separate the cooling holes 106 within the trench 104. For example, as shown, the trench 104 includes an undulating surface 95 defining a minimum depth 96 and a maximum depth 97 of the trench 104. The undulating surface 95 includes a curved surface defining a cooling wall 94 between two adjacent outlets 92. The cooling wall 94 can include a peak 98 defining the minimum depth 96. At least one of the outlets 92 can define the maximum depth 97. The cooling walls 94 may extend out of the cooling holes 106 to define at least part of the outlets 92. Such cooling walls 94 may include a rounded profile along the trench 104. Though, in other embodiments, the cooling walls 94 may include at least one hard edge. In one embodiment, as shown, the cooling holes 106 may diverge between the cooling passageway 116 and the trench 104. For example, the cooling holes 106 may fan out to fill the length of the trench 104. Further, as described in more detail below, the trench 104 may be tangent to at least one of the outlets 92 (e.g., at least one of the leading face 110 or trailing face 112). It should be recognized that the individual cooling holes 106 and/or outlets 92 may define different geometry. For example, a portion of the cooling holes 106 and/or outlets 92 may diffuse between the cooling passageway 116 and the trench 104. While another portion of the cooling holes 106 and/or outlets 92 may define the same cross-sectional area along the flowpath of the cool air F and/or define a reducing cross-sectional area that converges. Further, the cooling holes 106 and/or outlets 92 may define different cross-sectional shapes. For instance, a portion of the cooling holes 106 and/or outlets 92 may have a circular cross-sectional shape while another portion has elliptical, rectangular, square, or any other suitable cross-sectional shape.

Figure 6:
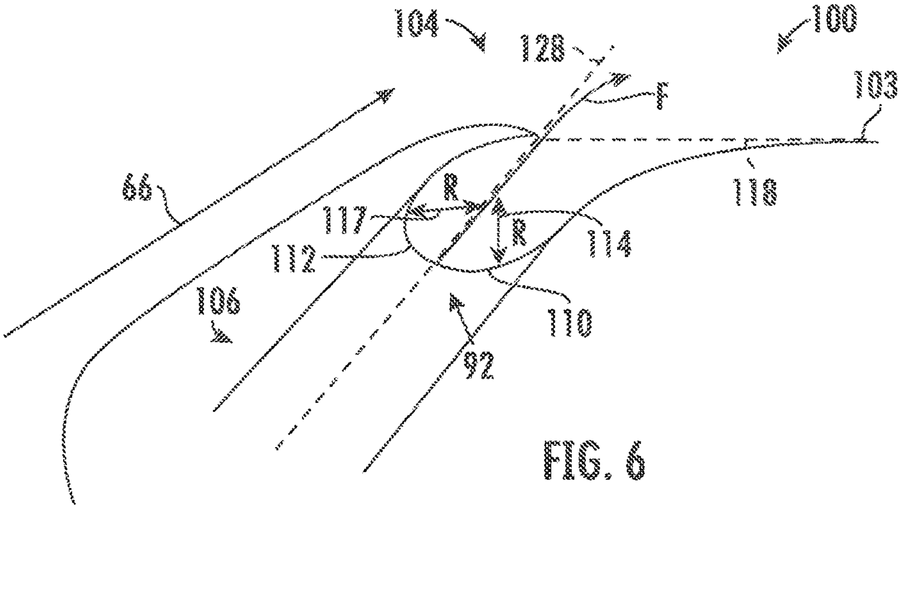
FIG. 6 illustrates a side view of one embodiment of the trench in accordance with aspects of the present disclosure, particularly illustrating a leading face and trailing face of the trench.

Referring now to FIG. 6, a side view is illustrated of one embodiment of the trench 104. Particularly, FIG. 6 illustrates the trench 104 including a leading face 110 and a trailing face 112. In certain embodiments, the leading face 110 may be downstream of the cooling holes 106 in the direction the hot combustion gas 66 flows. Whereas, the trailing face 112 may be upstream of the leading face 110 from the direction the hot combustion gas 66 flows. Further, the leading face 110 and the trailing face 112 may meet at the cooling hole 106. The cool air F may exit the outlet 92 of the cooling hole 106 and into the trench 104. For example, the cool air F may fill the trench 104 before flowing downstream to cool the component 100. By filling the trench 104 before going downstream, hot spots between cooling holes 106 may be avoided. For example, the trench 104 may prevent one or more spots between cooling holes 106 from not receiving cool air F. The trench 104 may also prevent hot spots from propagating downstream of the cooling holes 106, where cool air F is desired to dissipate heat from the component 100 and to provide the cooling film.

As shown in FIG. 6, leading face 110 and trailing face 112 may each be tangent to at least one of the plurality of outlets 92. For instance, in certain embodiments, the leading face 110 and trailing face 112 may each be tangent to a portion of the surface(s) defining at least one of the outlets 92. In other embodiments, only one of the leading face 110 or trailing face 112 may be tangent to the surface(s) of the outlets 92. In other embodiments, either the leading face 110 or trailing face 112 or both may at least partially define one or more of the outlets 92. In certain embodiments, the leading face 110 and trailing face 112 may be tangent to each of the plurality of outlets 92. In other embodiments, the leading face 110 and trailing face 112 may be tangent to only a portion of the plurality of outlets 92. It should be recognized that a leading face 110 and trailing face 112 tangent to the outlet(s) 92 may define a smooth transition between the outlet(s) 92 and the trench 104. Further, the trench 104 may direct the cool air F along the contour of the component 100, such as the exterior surface 103.

In certain embodiments, the leading face 110 may define a first radius of curvature 114. Similarly, the trailing face 112 may define a second radius of curvature 117. Further, each of the first radius of curvature 114 and second radius of curvature 117 may be defined by a portion of or the entirety of the leading face 110 and the trailing face 112 respectively. Additionally, the first radius of curvature 114 and second radius of curvature 117 may each define their own respective center points or, in certain embodiments, may define the same center point. In the depicted embodiment, the first radius of curvature 114 may be greater than the second radius of curvature 117. As such, at least a portion of the trailing face 112 may define a tighter arc than an arc defined by at least a portion of the first face 110. Further, the arcs of the first face 110 and second 112 may be tangent to each other, e.g., at the cooling hole(s) 106 and/or the outlet(s) 92. As such, the trench 104 may define a smooth transition between the leading face 110 and the trailing face 112. The cool air F may impinge on the trailing face 112 such that the second radius of curvature 117 directs the cool air F along a contour of the component 100. It should be recognized that a tighter arc on the trailing face 112 may direct or hook the cool air F along a contour of the component 100, e.g., the exterior surface 103. By contouring the cool air F over the surface of the component 100, the cool air F may better dissipate heat from the component 100. Further, less cool air F may be needed to provide an adequate cooling film over the exterior surface 103 of the component 100, necessitating less cool air F bled from the compressor section 21. Bleeding less air from the compressor section 21 may produce a more efficient gas turbine engine 10.

It should be recognized that the leading face 110 and/or the trailing face 112 may include any further geometry capable of directing the air F along the contour of the component 100. For example, one or both of the faces 110, 112 may include straight segments, curved segments, angled segments, or segments defined by any polynomial of any degree defining a portion or the entire face 110, 112. Further, either or both of the faces 110, 112 may include more than one segment defined by differing geometry to direct the cool air F along the contour of the component 100. In addition, the geometry of either face 110, 112 may vary along the length of the trench 104. For example, a smaller second radius of curvature 117 may be defined on one end of the trench, and a larger second radius of curvature 117 may be defined on another end of the trench 104 with a transition therebetween. It should be recognized that the geometry may vary along the length of the trench 104 and transition between different geometries with different characteristics, e.g., different radii.

In certain embodiments, the trench 104 may be at least partially recessed into the component 100. For example, as shown in the embodiment of FIG. 6, the leading face 110, cooling holes 106, outlets 92, and/or trailing face 112 may be below the exterior surface 103 of the component 100. For example, the component 100 may define a component plane 118 along the exterior surface 103 of the component 100, such as along at least one of the first band surface 105, the airfoil surface 85, and/or the second band surface 109. In certain embodiments, the entire trench 104 may be recessed into the component 100 below the component plane 118.

Figure 7:
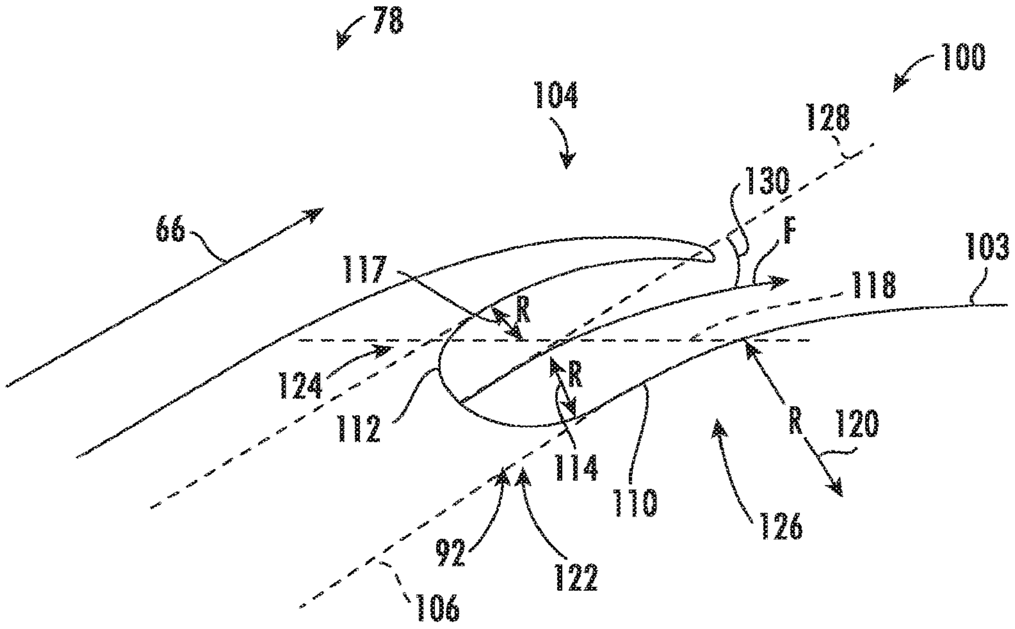
FIG. 7 illustrates a side view of another embodiment of the trench in accordance with aspects of the present disclosure, particularly illustrating a trench that extends past a surface the component.

Referring now to FIG. 7, another embodiment of the trench 104 is illustrated according to aspects of the present disclosure. Particularly, FIG. 7 illustrates a trench 104 that at least partially extends past the exterior surface 103 of the component 100. As shown, at least a portion of the trench 104 may extend past the component plane 118 and into the flowpath 78 for the hot combustion gas 66. For example, the trailing face 112 may extend past the first band surface 105, the second band surface 109, and/or the airfoil surface 85.

In a further embodiment, the leading face 110 may define a third radius of curvature 120 to direct the cool air F along the contour of the component 100. The third radius of curvature 120 may be downstream of the first radius of curvature 117 relative to the flowpath 78. In one embodiment, the first arc defined by the first radius of curvature 114 may be tangent to a third arc defined by the third radius of curvature 120. As such, the trench 104 may include a smooth transition on the first face 110 between the first radius of curvature 114 and the third radius of curvature 120. In one embodiment, the leading face 110 may include a layback including the third radius of curvature 120 and/or the first radius of curvature 114. For instance, the first radius of curvature 114 and/or the third radius of curvature 120 may be defined within the trench 104, or, in certain embodiments, the first and/or second radii of curvature 114, 120 may be defined within at least one of the outlets 92.

In one embodiment, the outlets 92 of the cooling holes 106 may be defined on a bottom portion 122 of the trench 104 and extend longitudinally along the trench 104. In other embodiments, the outlets 92 may be defined on a back portion 124 of the trench 104. In a still further embodiment, the outlets 92 may be defined on a front portion 126 of the trench 104. It should be recognized that, in other embodiments, a portion of a plurality of outlets 92 may be positioned on at least one of the bottom, back, or front portions 122, 124, 126 of the trench 104 while another portion is positioned on another of the bottom, back, or front portions 122, 124, 126 of the trench 104.

Still referring to FIG. 7, at least one of the plurality of cooling holes 106 and/or outlets 92 may define a cooling axis 128 extending from the at least one cooling hole 106 and/or outlet 92. In certain embodiment, the cooling axis 128 may be tangential to the flowpath 78. For example, the cool air F may leave the outlet 92 generally parallel to the combustion gas 66 (see, e.g., FIG. 8). In another embodiment, the plurality of cooling holes 106 may define a plurality of cooling axes 128. In such embodiments, the plurality of cooling axes 128 may define a cooling plane between the respective cooling axes 128. As such, the cooling plane may extend approximately along a length of the trench 104 and have the same general shape as the trench 104. For example, the cooling plane of a trench 104 with a curved profile may also have a curved profile. Further, such a cooling plane may be tangential to the flowpath 78. It should be recognized that the cool air F may exit the trench 104 along the cooling axis 128 such that the cool air F is generally parallel and/or tangential to the combustion gas 66 (see, e.g., FIG. 8). Though it should be recognized that the cool air F may exit the trench 104 at a low angle relative to component plane 118 near tangential to the combustion gas 66. In other embodiments, the trailing face 112 may direct the cool air F along the contour of the component 100, which may be parallel to the cooling axis 128 or may be at a different angle relative to the cooling axis 128. For example, the cool air F and cooling axis 128 may define a cooling angle 130 therebetween such that the trench 104 contours the cool air F along the exterior surface 103.

In certain embodiments, the trailing face 112 may end before the trailing face 112 intersects the cooling axis 128 and/or the cooling plane (see, e.g., FIG. 6). For example, the second radius of curvature 117 and any other geometry defined by the trailing face 112 may end before the cooling axis 128 and/or cooling plane. In another embodiment, the trailing face 112 may extend approximately to the cooling axis 128 and/or the cooling plane. In a still further embodiment, such as the embodiment of FIG. 7, the trailing face 112 may extend past the cooling axis 128 and/or cooling plane. For example, the second radius of curvature 117 and/or any other geometry defined on the trailing face 112 may extend past at least one of the cooling axes 128. In certain embodiments, the trailing face 112 may extend far enough to redirect the cool air F to the leading face 110. Further, it should be recognized that a trailing face 112 that extends past one of the cooling axes 128 may allow the cool air F to leave the trench 104 at the cooling angle 130 below one of the cooling axes 128.

Figure 8:
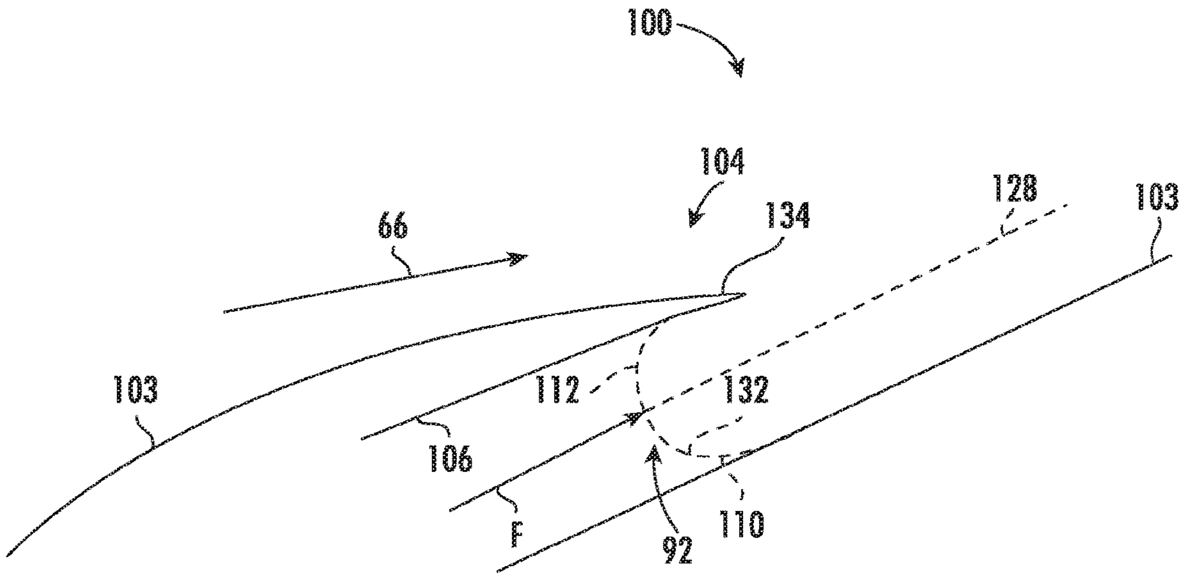
FIG. 8 illustrates a side view of another embodiment of the trench in accordance with aspects of the present disclosure, particularly illustrating a trench formed from a plurality of segments.

Referring now to FIG. 8, a side view of another embodiment of the trench 104 is illustrated according to aspects of the present disclosure. Particularly, FIG. 8 illustrates the trench 104 formed from a plurality of segments 132. In some embodiments (see, e.g., FIGS. 6 and 7), at least one of the first radius of curvature 114 or the second radius of curvature 117 is defined by a continuous curvature. In further embodiments, as illustrated, at least one of the leading face 110 or the trailing face 112 includes a plurality of segments 132 to define the first radius of curvature 114, the second radius of curvature 117, and/or the third radius of curvature 120 (omitted for clarity), and/or any further geometry defined by the leading face 110 and/or the trailing face 112. For example, one or more of the radii of curvature 114, 117, 120 may be defined by a combination of straight segments and/or curved segments. In one embodiment, a series of straight segments may approximate the radii of curvature 114, 117, 120.

It should also be recognized that any of the radii of curvature 114, 117, 120 may include local areas with a different radius of curvature that, combined with other local areas, approximate the total radii of curvature 114, 117, 120. In addition, the leading face 110 and/or trailing face 112 may define additional radii of curvature. For example, the trailing face 112 may include additional radii of curvature toward a tip end 134 of the trailing face 112. Such additional radii of curvature may be greater than or less than the second radius of curvature 117. It should be recognized that at least one of the radii of curvature 114, 117 may be defined by an ellipse. In such embodiments, the smallest radius of curvature of the ellipse on the leading face 110 may be larger than the largest radius of curvature of the ellipse on the trailing face 112. Further, the leading face 110 and/or trailing face 112 may include a flat section(s) downstream of the first radius of curvature 114 or the second radius of curvature 117 respectively. In some embodiments, the leading face 110 and/or trailing face 112 may include segments with contours defined by polynomials of any degree. Further, in such embodiments, the leading face 110 may include one or more segments that may be approximated by the first radius of curvature 114, and the trailing face 112 may include one or more segments that may be approximated by the second radius of curvature 117 less than first radius of curvature 114.

In certain embodiments, the tip end 134 of the trailing face 112 may define a thickness such that the trailing face 112 does not come to a fine point and/or a knife's edge. As such, the thickness may lead to a more robust trailing face 112 that may withstand incidental contact or handling, such as during repair procedures, cleaning, and/or routine examination.

It should be recognized that the second trench 204 (see, e.g., FIGS. 2 and 3) or additional other trenches 104 may generally be configured as the trench 104 of FIGS. 5-8. For example, the second trench 204 may include a leading face 110 and a trailing face 112 defining a first radius of curvature 114, a second radius of curvature 117, straight segments, and/or any other geometry defined herein. Further, in certain embodiments, the first radius of curvature 114 may be greater than the second radius of curvature 117. Additionally, second trench 204 may direct the cool air F along a contour of the component 100. For example, the cool air F may impinge on the trailing face 112 of the second trench 204 such that the second radius of curvature 117 directs the cool air F along a contour of the component 100.

Figure 9:
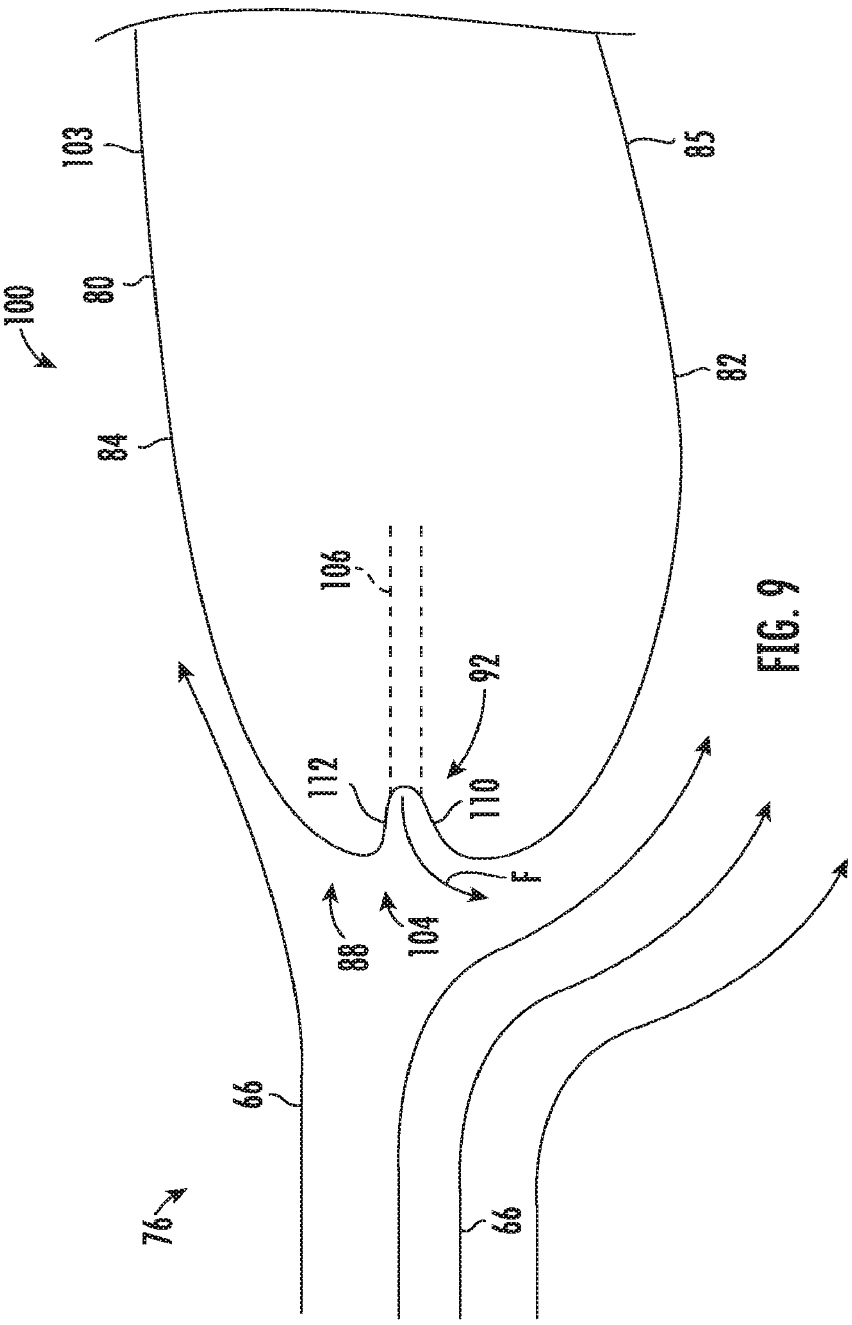
FIG. 9 illustrates a side view of a still further embodiment of the trench in accordance with aspects of the present disclosure, particularly illustrating a trench positioned on a leading edge of an airfoil.

Referring now to FIG. 9, another embodiment of the trench 104 is illustrated according to aspects of the present subject matter. Particularly, FIG. 9 illustrates a trench 104 positioned on the leading edge 88 of the airfoil 80. In certain embodiments, the leading edge 88 may be the natural stagnation point for the hot combustion gas 66. Further, the hot combustion gas 66 that hits the stagnation point may normally split approximately evenly between the pressure side 82 and the suction side 84.

In the embodiment depicted, however, the trench 104 may redirect the hot combustion gas 66. For instance, the trailing face 112 may direct the cool air F to one of the pressure side 82 or suction side 84. As such, by directing the cool air F to one of the pressure side 82 or suction side 84, the hot combustion gas 66 that would normally impact the leading edge 88 and/or the stagnation point may also be directed toward one of the pressure side 82 or suction side 84. For example, a majority of the hot combustion gas 66 that would impact the leading edge 88 may be directed toward the pressure side 82, as shown in FIG. 9. It should be recognized that the second radius of curvature 117 (omitted for clarity) on the trailing face 112 may also direct the hot combustion gas 66 to one of the pressure side 82 or the suction side 84.

Figure 10:
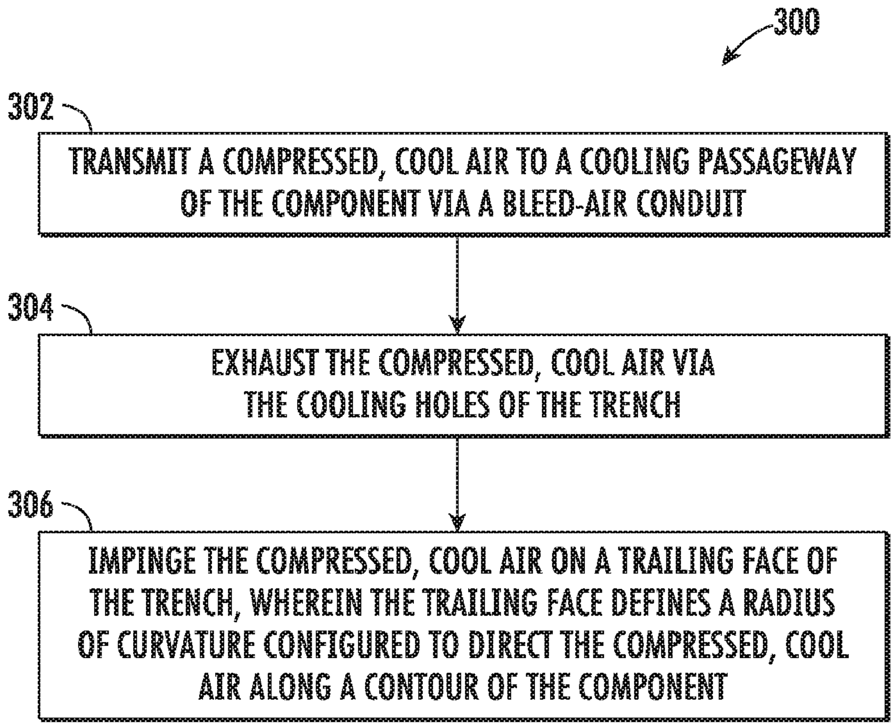
FIG. 10 depicts one embodiment of a method for cooling a component of a gas turbine engine in accordance with aspects of the present disclosure.

Referring now to FIG. 10, one embodiment of a method (300) for cooling a component of a gas turbine engine is depicted according to aspects of the present disclosure. It should be recognized that the gas turbine engine may be the gas turbine engine 10 described in regards to FIG. 1 or any other suitable gas turbine engine. For example, the gas turbine engine may include a compressor section and a flowpath. The component may be any of the components 100 described in regards to FIGS. 3 and 4 or any other suitable component including a trench with cooling holes. Further the trench and cooling holes may generally be configured as the trench(es) 104 and cooling holes 106 described in regards to FIGS. 3-9.

The method (300) may include (302) transmitting a compressed, cool air to a cooling passageway of the component via a bleed-air conduit. For example, the bleed-air conduit may fluidly couple a cooling passageway of the component to the compressor section. In certain embodiments, the compressed, cool air may be bleed from a high pressure compressor of the compressor section. In other embodiments, the compressed, cool air may be bled from a low pressure compressor of the compressor section. Still, in further embodiments, the compressed, cool air may be bled from both the high pressure and low pressure compressors. It should be recognized that, in other embodiments, the compressed, cool air may be supplied by from any capable source, e.g., a bypass airflow passage, another compressor, or a pump. The method (300) may also include (304) exhausting the compressed, cool air via the cooling holes of the trench. Additionally, the method (300) may include (306) impinging the compressed, cool air on a trailing face of the trench. The trailing face may define a radius of curvature configured to direct the compressed, cool air along a contour of the component. As such, the compressed, cool air may cool the component. It should be further understood that the method (300) may further include any of the additional features and/or steps as described herein.

In one embodiment, at least one of the trench 104, the airfoil 80, the first band 102, or the second band 108 may be formed via additive manufacturing. In further embodiments, the entire component 100 may be formed via additive manufacturing. In such embodiments, the component 100 may be one integral piece or an assembly of the first band 102, the airfoil 80, and/or second band 108. In embodiments where at least one part of the component 100 is formed via additive manufacturing, the cooling passageway 116, cooling holes 106, outlets 92, and/or the trench 104 may be produced in the component 100 during the additive manufacturing process.

In general, the exemplary embodiments of the component 100 described herein may be manufactured or formed using any suitable process. However, in accordance with several aspects of the present subject matter, the component 100 may be formed using an additive-manufacturing process, such as a 3D printing process. The use of such a process may allow the component 100 to be formed integrally, as a single monolithic component, or as any suitable number of subcomponents. In particular, the manufacturing process may allow the component 100 to be integrally formed and include a variety of features not possible when using prior manufacturing methods. For example, the additive manufacturing methods described herein enable the manufacture of trenches 104 having any suitable size and shape with one or more configurations of the leading face 110, the trailing face 112, the outlets 92, the cooling holes 106, the cooling passageway 116, and/or other features which were not possible using prior manufacturing methods. Some of these novel features are described herein.

As used herein, the terms "additively manufactured," "additive manufacturing techniques or processes," or the like refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as needed depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components 100 described herein were previously not possible due to manufacturing restraints. However, the present inventors have advantageously utilized current advances in additive manufacturing techniques to develop exemplary embodiments of such components 100 generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components 100 described herein. For example, such components 100 may include thin additively manufactured layers and unique fluid passageways, such as the trench 104, cooling holes 106, outlets 92, and/or cooling passageway 116. In addition, the additive manufacturing process enables the manufacture of a single component having different materials such that different portions of the component may exhibit different performance characteristics. The successive, additive nature of the manufacturing process enables the construction of these novel features. As a result, the components 100 described herein may exhibit improved performance and reliability.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component for a turbine engine, comprising:

a body with an exterior surface abutting a combustion flowpath for a combustion gas flow through the turbine engine;

a cooling passage defined within the body and supplying cooling air to the component; and a trench on the exterior surface, comprising:

an undulating surface defining a minimum depth and a maximum depth of the trench with respect to the exterior surface;

a plurality of outlets in the undulating surface; and a plurality of cooling holes extending from the cooling passage to the corresponding plurality of outlets;

wherein the undulating surface comprises a curved surface defining a cooling wall between two adjacent outlets in the plurality of outlets, wherein at least one outlet in the plurality of outlets is located at the maximum depth of the trench; and wherein at least one cooling hole in the plurality of cooling holes comprises a cross-sectional area that increases in a direction toward the plurality of outlets.

2. The component of claim 1, wherein the cooling wall comprises a peak defining the minimum depth of the trench.

3. The component of claim 2, wherein the plurality of outlets comprises a first outlet and a second outlet, and the peak is located between the first outlet and the second outlet.

4. The component of claim 1, wherein the undulating surface defines a plurality of peaks along the trench, wherein at least one peak in the plurality of peaks defines the minimum depth of the trench.

5. The component of claim 4, wherein the plurality of peaks are interspersed with the plurality of outlets in an alternating arrangement.

6. The component of claim 1, wherein the plurality of cooling holes comprises a first cooling hole and a second cooling hole, wherein the first cooling hole diverges from the second cooling hole between the cooling passage and the plurality of outlets.

7. The component of claim 1, wherein the plurality of outlets comprises a first outlet and a second outlet, wherein the first outlet defines a first geometric profile and the second outlet defines a second geometric profile different from the first geometric profile.

8. The component of claim 1, wherein the component is a turbine rotor blade, wherein the body comprises a first band and an airfoil extending radially from the first band, wherein the exterior surface comprises a first band surface and an airfoil surface, and wherein the trench is positioned on at least one of the first band surface or the airfoil surface.

9. The component of claim 1, wherein the component is a turbine nozzle, wherein the body comprises a first band, a second band positioned radially outward from the first band, and an airfoil extending therebetween, wherein the exterior surface comprises a first band surface, an airfoil surface, and a second band surface, and wherein the trench is positioned on at least one of the first band surface, the airfoil surface, or the second band surface.

10. The gas turbine engine, comprising:

a compressor section, a combustion section, and a turbine section in axial flow arrangement, the combustion flowpath extending through the combustion section and the turbine section for the flow of combustion gas therethrough; and the component of claim 1.

11. The component of claim 1, wherein the component is a turbine nozzle, wherein the body comprises a first band, a second band positioned radially outward from the first band, and an airfoil extending therebetween, wherein the exterior surface comprises a first band surface, an airfoil surface, and a second band surface, and wherein the trench is positioned on at least one of the first band surface, the airfoil surface, or the second band surface.

12. The component of claim 1, wherein the plurality of cooling holes includes at least a first cooling hole and a second cooling hole diverging from the first cooling hole between the cooling passage and the plurality of outlets.

13. The component of claim 1, wherein a portion of the trench includes equally spaced outlets of the plurality of outlets and a portion of the trench includes unequally spaced outlets of the plurality of outlets.

14. A component for a turbine engine, comprising:

a body with an exterior surface abutting a combustion flowpath for a combustion gas flow through the turbine engine;

a cooling passage defined within the body and supplying cooling air to the component; and a trench on the exterior surface, comprising:

an undulating surface defining a minimum depth and a maximum depth of the trench with respect to the exterior surface;

a plurality of outlets in the undulating surface;

a first curvilinear cooling hole extending from the cooling passage to the corresponding plurality of outlets; and a second curvilinear cooling hole extending from the cooling passage to the corresponding plurality of outlets, the first curvilinear cooling hole diverging from the second curvilinear cooling hole between the cooling passage and the corresponding plurality of outlets;

wherein the undulating surface comprises a curved surface defining a cooling wall between two adjacent outlets in the plurality of outlets.

15. The component of claim 14, wherein the cooling wall comprises a peak defining the minimum depth of the trench.

16. The component of claim 14, wherein the undulating surface defines a plurality of peaks along the trench, wherein at least one peak in the plurality of peaks defines the minimum depth of the trench.

17. The component of claim 16, wherein the plurality of peaks are interspersed with the plurality of outlets in an alternating arrangement.

18. The component of claim 14, wherein the plurality of outlets comprises a first outlet and a second outlet, wherein the first outlet defines a first geometric profile and the second outlet defines a second geometric profile different from the first geometric profile.

19. The component of claim 14, wherein the component is a turbine rotor blade, wherein the body comprises a first band and an airfoil extending radially from the first band, wherein the exterior surface comprises a first band surface and an airfoil surface, and wherein the trench is positioned on at least one of the first band surface or the airfoil surface.

20. The gas turbine engine, comprising:

a compressor section, a combustion section, and a turbine section in axial flow arrangement, the combustion flowpath extending through the combustion section and the turbine section for the flow of combustion gas therethrough; and the component of claim 14.

* * * * *